(12) United States Patent
Roettger et al.

(10) Patent No.: US 9,702,326 B2
(45) Date of Patent: Jul. 11, 2017

(54) INTERNAL COMBUSTION ENGINE HAVING A FUEL SUPPLY SYSTEM FOR STOP-AND-GO OPERATION

(71) Applicant: Ford Global Technologies, LLC, Dearborn, MI (US)

(72) Inventors: Daniel Roettger, Eynatten (BE); Christian Winge Vigild, Aldenhoven (DE); Leonhard Bartsch, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 666 days.

(21) Appl. No.: 14/106,079

(22) Filed: Dec. 13, 2013

(65) Prior Publication Data

US 2014/0196690 A1  Jul. 17, 2014

(30) Foreign Application Priority Data

Jan. 14, 2013  (DE) .................. 10 2013 200 421

(51) Int. Cl.
*F02M 55/02* (2006.01)
*F02D 33/00* (2006.01)
(Continued)

(52) U.S. Cl.
CPC ........... *F02M 55/02* (2013.01); *F02D 33/006* (2013.01); *F02D 41/065* (2013.01);
(Continued)

(58) Field of Classification Search
CPC ............. F02M 63/0225; F02M 57/025; F02M 63/0003; F02M 59/022; F02M 41/16;
(Continued)

(56) References Cited

U.S. PATENT DOCUMENTS 4,884,543 A * 12/1989 Stutzenberger ...... F02M 41/125
                                                        123/373
4,913,113 A *  4/1990 Baranescu ............. F02M 45/08
                                                        123/300
(Continued)

FOREIGN PATENT DOCUMENTS

DE  102009028739    *  3/2011
DE  102009028739 A1    3/2011
(Continued)

*Primary Examiner* — Hieu T Vo
*Assistant Examiner* — Arnold Castro
(74) *Attorney, Agent, or Firm* — Julia Voutyras; McCoy Russell LLP

(57) ABSTRACT

Embodiments for an internal combustion engine are provided. In one example, and internal combustion engine comprises at least two cylinders each including an injection nozzle and a fuel supply system for supplying the cylinders with fuel. The fuel supply system includes a supply line connecting each injection nozzle to a first fuel reservoir storing fuel at a first pressure, the first fuel reservoir filled by a pump provided upstream, a second fuel reservoir storing fuel at a second pressure less than the first pressure and connected to the first fuel reservoir via a connecting line for filling with fuel, and a bypass line connecting the second fuel reservoir to each injection nozzle. The bypass line opens into the fuel supply system downstream of the first fuel reservoir, thereby forming a connection point, and a shutoff element is arranged in the bypass line, opening or shutting off the bypass line.

20 Claims, 3 Drawing Sheets

(51) Int. Cl.
*F02M 63/02* (2006.01)
*F02D 41/06* (2006.01)
*F02N 11/08* (2006.01)
F02M 69/04 (2006.01)
F02D 41/00 (2006.01)
F02D 41/38 (2006.01)

(52) U.S. Cl.
CPC ....... *F02M 63/029* (2013.01); *F02N 11/0818* (2013.01); *F02D 2041/0095* (2013.01); *F02D 2041/389* (2013.01); *F02D 2041/3881* (2013.01); *F02M 69/044* (2013.01); *F02M 2200/60* (2013.01); *Y02T 10/48* (2013.01)

(58) Field of Classification Search
CPC .... F02M 57/02; F02M 59/366; F02D 41/402; F02D 41/042; F02N 11/0814; F02N 11/0818
USPC ............. 123/446, 447, 448, 299, 300, 179.4
See application file for complete search history.

(56) References Cited

U.S. PATENT DOCUMENTS

| | | | |
|---|---|---|---|
| 5,447,143 A | 9/1995 | Ott et al. | |
| 5,595,161 A * | 1/1997 | Ott | F02D 41/009 123/491 |
| 5,642,714 A * | 7/1997 | Buckley | F02M 63/0007 123/447 |
| 5,771,865 A * | 6/1998 | Ishida | F02M 45/04 123/300 |
| 5,771,946 A * | 6/1998 | Kooy | F17C 6/00 141/11 |
| 6,192,862 B1 * | 2/2001 | Tanabe | F02D 41/062 123/447 |
| 6,598,590 B1 * | 7/2003 | Mahr | F02M 55/025 123/447 |
| 7,827,975 B1 * | 11/2010 | Gibson | F02N 11/0814 123/179.3 |
| 2005/0103312 A1 * | 5/2005 | Uchiyama | F02D 41/221 123/457 |
| 2006/0021599 A1 * | 2/2006 | Ciampolini | F02M 59/105 123/446 |
| 2011/0073057 A1 * | 3/2011 | Lippa | F02D 19/0684 123/1 A |
| 2011/0313639 A1 * | 12/2011 | Hemmerlein | F02M 63/0225 701/103 |
| 2012/0055446 A1 * | 3/2012 | Hashizume | F02D 31/002 123/349 |
| 2012/0247421 A1 * | 10/2012 | Reitz | F02B 1/14 123/299 |
| 2012/0325180 A1 * | 12/2012 | Montgomery | F02D 41/403 123/299 |
| 2014/0196690 A1 * | 7/2014 | Roettger | F02D 33/006 123/446 |

FOREIGN PATENT DOCUMENTS

| | | | |
|---|---|---|---|
| JP | 57073855 A | * | 5/1982 |
| JP | 2005076510 A | | 3/2005 |

* cited by examiner

INTERNAL COMBUSTION ENGINE HAVING A FUEL SUPPLY SYSTEM FOR STOP-AND-GO OPERATION

CROSS REFERENCE TO RELATED APPLICATIONS

The present application claims priority to German Patent Application No. 102013200421.4, filed on Jan. 14, 2013, the entire contents of which are hereby incorporated by reference for all purposes.

FIELD

The disclosure relates to an internal combustion engine having at least two cylinders and a fuel supply system for supplying the cylinders with fuel.

BACKGROUND/SUMMARY

Owing to the limited resources of fossil fuels, especially limited reserves of mineral oil as a raw material for the production of fuels for operating internal combustion engines, there are constant efforts to reduce the fuel consumption of internal combustion engines. Here, improved, i.e. more effective, combustion is in the foreground of these efforts. However, certain strategies in respect of the fundamental operation of the internal combustion engine can also be helpful.

One concept for reducing the fuel consumption of a vehicle includes, for example, in switching off the internal combustion engine instead of continuing to operate it at idle when there is no demand for power. In practice, this means that the internal combustion engine is switched off at least when the vehicle is stationary. One application is "stop-and-go" traffic of the kind which occurs, for example, in congestion on freeways and highways. In towns, stop-and-go traffic is no longer the exception but the rule, owing to the uncoordinated traffic light systems which are present. Restricted railroad crossings and the like represent further applications. Within the context of the present disclosure, switching off the internal combustion engine when there is no demand for power, together with restarting, is also referred to as stop-and-go operation of the internal combustion engine.

The problem with concepts which switch off the internal combustion engine in the absence of demand in order to reduce fuel consumption is the need to restart the internal combustion engine.

Restarting presents problems, inter alia, because the crankshaft and the camshaft come to a halt in a random and furthermore unknown position when the internal combustion engine is shut down in an uncontrolled manner. Consequently, the position of the pistons in the at least two cylinders of the internal combustion engine is likewise unknown and is left to chance. However, this information is indispensable for a restart which is uncomplicated and as rapid and therefore as low in fuel consumption as possible.

Markers arranged on the crankshaft and/or on the camshaft can supply signals relating to the crank angle position to sensors connected to the engine controller. However, to generate these signals it is first necessary to set the crankshaft in rotation. If there is a lack of clarity on the crank angle position at the beginning of a restart, a run-in phase to synchronize the engine operating parameters with the crankshaft rotation is necessary.

It is necessary to know the position of the individual pistons of an internal combustion engine, for example, to enable fuel injection to take place selectively, i.e. at defined crank angles. The task of controlling injection is generally performed by an engine controller.

According to the prior art, the signal generated by a crankshaft sensor or camshaft sensor is used by the engine controller to calculate the speed of rotation and angular position of the crankshaft. The engine controller utilizes these data to calculate the fuel injection and quantity of fuel under all operating conditions of the internal combustion engine. A crankshaft sensor is preferably used since the crankshaft revolves at twice the speed of the camshaft and hence supplies a signal with a significantly higher resolution.

The piston position can be determined with significantly greater accuracy with the aid of a crankshaft signal than with the aid of a camshaft signal. The camshaft sensor is preferably used to enable it to be determined whether the cylinder is in the combustion cycle—compression and expansion—or in the charge exchange cycle—exhaust and intake. Since, in the case of a four stroke internal combustion engine, one operating cycle, consisting of compression, expansion, exhaust and intake, comprises 720° of crankshaft angle (KW), it may be necessary to ascertain whether a piston situated at top dead center (TDC) is at "combustion TDC" or at top dead center during charge exchange.

In practice, it is generally the case that the position of just one single cylinder of the internal combustion engines is determined by means of said sensors, thereby establishing the position of the other cylinders.

In order to facilitate restarting, various concepts are proposed in the prior art. German Patent Application DE 42 30 616, for example, proposes to store the angular position of the crankshaft, which is recorded when switching off, and to use it for restarting, ensuring that the appropriate injection timings are immediately available.

Other approaches to a solution give preference to methods for controlled shutdown and starting of the internal combustion engine. Here, controlled shutdown includes deliberately adopting very particular crank angle positions—referred to as preferential positions—when switching off the internal combustion engine. Here, the end position of the crankshaft is no longer left to chance but is deliberately brought about.

However, even if the position of the crankshaft and the position of the pistons at the beginning of a restart are known, the starting operation generally comprises several revolutions of the crankshaft or several operating cycles since the fuel pump may first of all build up in the fuel supply system the pressure required for injection before fuel can actually be introduced into the cylinders by means of fuel injection nozzles. When the internal combustion engine is switched off, it is generally not possible to maintain the pressure in the fuel supply system owing to a lack of leaktightness or to leaks.

Another disadvantage of strategies in which the internal combustion engine is switched off in the absence of demand in order to reduce fuel consumption is that the demands on the starting device are increased by stop-and-go operation. On the one hand, the number of starting operations increases if the internal combustion engine is switched off more frequently, and this requires a correspondingly robust starting device. On the other hand, the starting operation, which can take up to one second, prejudices responsiveness and, due to starting noise, driving comfort.

In order to be able to operate an internal combustion engine in accordance with various regulations, especially in respect of increasing stop-and-go traffic, i.e. to be able to switch it off in the absence of demand, it is thus necessary to simplify restarting, in particular to make it more rapid and more economical with fuel.

Given the background of what has been stated, the inventors herein provide a system to at least partly address the above issues in order to provide an engine restart that may be achieved more quickly and with less use of fuel than in the prior art.

In one embodiment, an internal combustion engine comprises at least two cylinders each including an injection nozzle and a fuel supply system for supplying the cylinders with fuel. The fuel supply system includes a supply line connecting each injection nozzle to a first fuel reservoir storing fuel at a first pressure, the first fuel reservoir filled by a pump provided upstream, a second fuel reservoir storing fuel at a second pressure less than the first pressure and connected to the first fuel reservoir via a connecting line for filling with fuel, and a bypass line connecting the second fuel reservoir to each injection nozzle. The bypass line opens into the fuel supply system downstream of the first fuel reservoir, thereby forming a connection point, and a shutoff element is arranged in the bypass line, opening or shutting off the bypass line.

In contrast to the prior art, the injection of fuel in the context of a restart is possible without delay, i.e. immediately upon initiation of the restart, in the case of the internal combustion engine according to the disclosure. For this purpose, the injection nozzles of the cylinders are supplied, i.e. fed, with fuel from a second fuel reservoir via a bypass line in the starting phase. This secondary fuel system assumes the task of supplying the cylinders or injection nozzles with fuel on an auxiliary basis until the pump has built up a sufficiently high pressure in the actual fuel supply system to be able to supply the cylinders or injection nozzles with fuel once again from the first fuel reservoir in accordance with normal operation of the internal combustion engine. In this case, it is necessary to open the shutoff element arranged in the bypass line.

Whereas the fuel in the first fuel reservoir has to be stored or made available at a sufficiently high pressure p1 to guarantee the fuel supply under all operating conditions in normal operation of the internal combustion engine, in particular also after a cold start, it is sufficient to store the fuel in the second fuel reservoir at a lower pressure p2 in order to supply the already preheated cylinders with fuel for n operating cycles in the context of stop-and-go operation.

Moreover, the lower pressure p2 in the secondary fuel system, that is used on an auxiliary basis, makes it possible to maintain this pressure p2 in the second fuel reservoir by shutting off the bypass line, i.e. by closing the shutoff element arranged in the bypass line, until a restart in the context of stop-and-go operation. Owing to the lower pressure level, there is no reduction in the fuel pressure of the kind that can be observed in the actual fuel supply system when the internal combustion engine is switched off. The second fuel reservoir can be connected to the first fuel reservoir via a connecting line for filling with fuel.

The internal combustion engine according to the disclosure allows a rapid restart using less fuel. Further advantages are obtained in respect of the quantities of pollutants generated during starting and in respect of a starting device used to assist the starting operation, which is superfluous and can be deactivated only a short time after the initiation of the restart, owing to the acceleration of the starting operation. Shortening the starting time improves responsiveness and, in particular, also driving comfort owing to lower noise emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

To conserve fuel, engines may be configured to automatically stop during idle conditions, such as when a vehicle in which the engine is installed is stopped at a traffic light. However, during the automatic restart following the automatic stop, the fuel pressure in the fuel system may not be at high enough pressure to start fuel injection, until after the engine has undergone a number of revolutions from the starter motor and the fuel pressure has built up pressure in the fuel system. This may cause delays in the automatic restart, causing operator frustration and stressing the starter motor.

Figure 1:
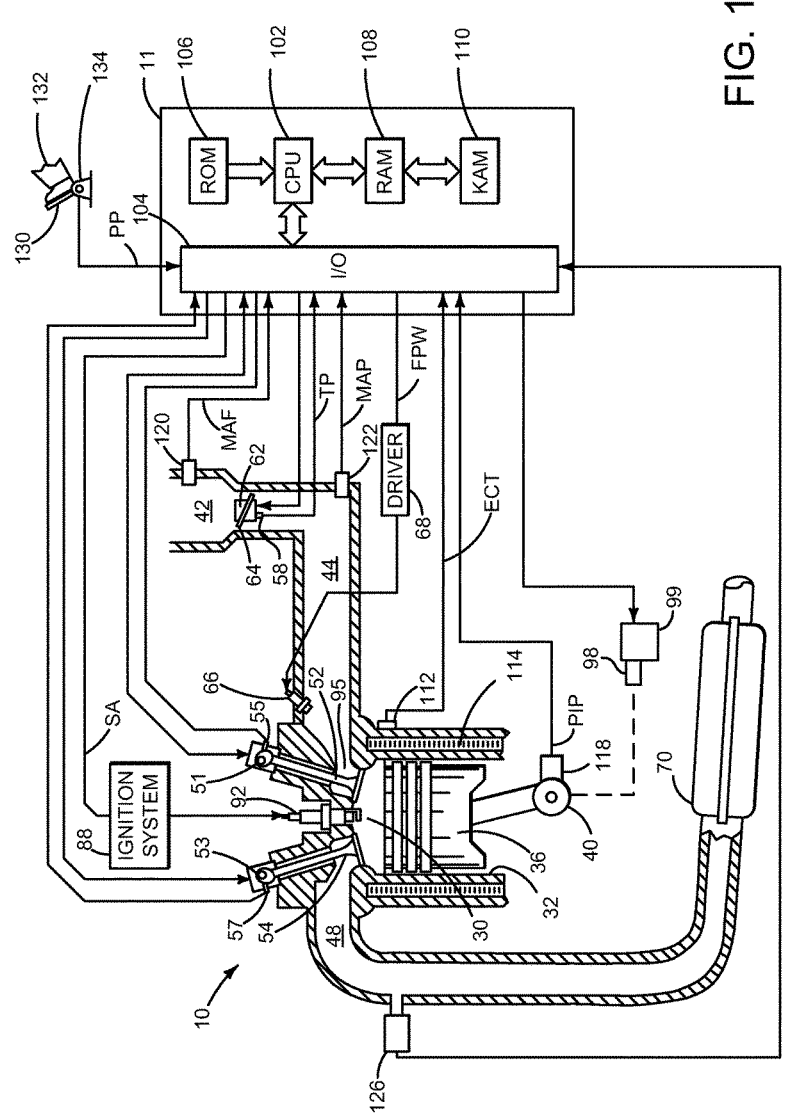
FIG. 1 schematically shows an embodiment of an internal combustion engine.
Figure 2:
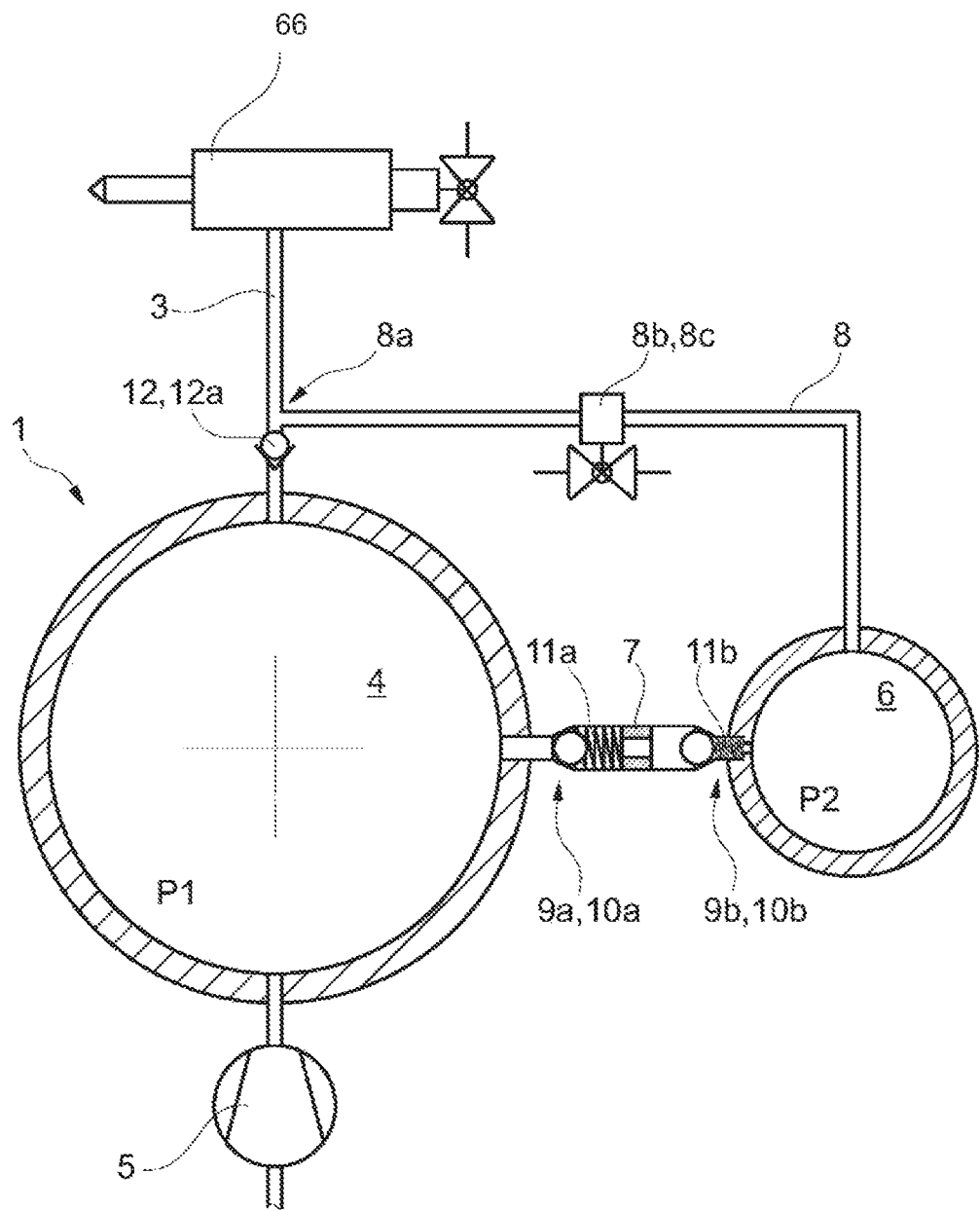
FIG. 2 shows the fuel supply system of a first embodiment of the internal combustion engine in the form of a basic diagram.

According to embodiments disclosed herein, a secondary or auxiliary fuel reservoir may hold a volume of fuel at a pressure lower than the main fuel tank but still sufficient for performing fuel injection. This pressurized fuel volume may be used to supply the cylinders with fuel during the first engine cycle of the restart, or until the fuel pump has pressurized the main fuel tank to a pressure high enough to sustain fuel injection. FIG. 1 illustrates an engine configured to undergo an automatic stop-start routine. FIG. 2 illustrates a fuel system to supply fuel to the engine of FIG. 1. The engine of FIG. 1 includes a controller storing non-transitory instructions that may be executed to carry out the method of FIG. 3.

Turning now to the figures, FIG. 1 shows an internal combustion engine 10, comprising a plurality of cylinders, one cylinder of which is shown in FIG. 1. Engine 10 is controlled by electronic engine controller 11. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel into an intake port 95 of cylinder 30, which is known to those skilled in the art as port injection. Alternatively, fuel may be injected to combustion chamber 30, which is known to those skilled in the art as direct injection. Fuel injector 66 delivers liquid fuel in proportion to the pulse width of signal FPW from controller 11. Fuel is delivered to fuel injector 66 by a fuel system (not shown) including a fuel tank, fuel pump, and fuel rail (not shown). Fuel injector 66 is supplied operating current from driver 68 which responds to controller 11. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 11. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 11 is shown in FIG. 1 as a conventional microcomputer including: microprocessor unit 102, input/output ports 104, read-only memory 106, random access memory 108, keep alive memory 110, and a conventional data bus. Controller 11 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 11. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

Engine 10 may be rotated via engine starter 99 during engine starting. Engine starter 99 may be electrically or hydraulically driven. Engine starter includes pinion 98 which can selectively engage engine 10 via a flywheel (not shown). Controller 11 can automatically selectively rotate engine 10 to start engine 10 after controller 11 automatically stops engine 10. Further, engine starter 99 may be engaged directly via a request via a vehicle operator or driver.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 shows a fuel supply system 1 of a first embodiment of the internal combustion engine schematically in the form of a basic diagram. Fuel supply system 1 may supply fuel to the engine 10 of FIG. 1.

The fuel supply system 1 serves to supply the cylinders with fuel. Each cylinder is assigned an injection nozzle 66. In normal operation, the injection nozzles 66 of the cylinders are fed with fuel from a first fuel reservoir 4. For this purpose, a supply line 3 connects the injection nozzles 66 to the first fuel reservoir 4, which stores fuel at a first, high pressure p1 and is filled and put under pressure by means of a high-pressure pump 5 provided upstream.

In order to be able to supply the cylinders with fuel in the starting phase immediately after initiation of a restart, a second fuel reservoir 6 is provided, which stores fuel at a second, lower pressure $p2<p1$ and can be connected to the injection nozzles 66 via a bypass line 8 by opening a shutoff element 8*b* arranged in the bypass line 8. The bypass line 8 opens into the fuel supply system 1 downstream of the first fuel reservoir 4, thereby forming a connection point 8*a*. In the present case, the shutoff element 8*b* arranged in the bypass line 8 is a valve 8*c* which can be actuated electrically by means of the engine controller 11. The second fuel reservoir is separate from, and located in a different position than, the first fuel reservoir.

A further shutoff element 12 is arranged between the first fuel reservoir 4 and the connection point 8*a*, said shutoff element being in the closed position and isolating the first fuel reservoir 4 from the fuel supply system 1 situated downstream during a restart, when the shutoff element 8*b* arranged in the bypass line 8 is opened. This prevents the pressure p2 in the secondary fuel supply system from dissipating via the first fuel reservoir 4. In the present case, a check valve 12*a* is used as a further shutoff element 12.

For filling with fuel, the second fuel reservoir 6 can be connected to the first fuel reservoir 4 via a connecting line 7. Two valves 9a, 9b, in the present case two self-acting pressure valves 10a, 10b, are arranged in the connecting line 7 between the first fuel reservoir 4 and the second fuel reservoir 6, said valves closing or opening the connecting line 7 as indicated. The second pressure valve 10b is arranged between the first pressure valve 10a and the second fuel reservoir 6.

As the pressure rises, the first pressure valve 10a opens against the return force of a first return spring 11a as soon as the pressure p1 in the first fuel reservoir 4 exceeds a first predeterminable pressure (p_open), with the result that the second fuel reservoir 6 is filled with fuel from the first fuel reservoir 4 via connecting line 7.

As the pressure in the fuel rises further, the second pressure valve 10b arranged in the connecting line 7 then closes against the return force of a second return spring 11b when a second predeterminable pressure (p_close) is reached, as a result of which the filling of the second fuel reservoir 6 with fuel is concluded.

The two pressure valves 10a, 10b also ensure that the connecting line 7 is shut off, i.e. closed, wherein the internal combustion engine is switched off and there is a restart, in order to ensure that the pressure p2 in the second fuel reservoir is not dissipated via the connecting line.

Examples of the internal combustion engine in which at least one valve is arranged in the connecting line between the first fuel reservoir and the second fuel reservoir, said valve being opened to fill the second fuel reservoir with fuel, are advantageous.

On the one hand, it may be possible to open the connecting line between the two fuel reservoirs in order to connect the second fuel reservoir to the first fuel reservoir for filling with fuel. On the other hand, however, it may also be possible to close the connecting line to ensure that the pressure p2 in the second fuel reservoir does not dissipate via the connecting line when the internal combustion engine is switched off.

Arranging a valve in the connecting line between the first fuel reservoir and the second fuel reservoir makes it possible to satisfy both conditions.

Examples of the internal combustion engine in which the at least one valve arranged in the connecting line is a self-acting pressure valve, which opens and closes in accordance with at least one applied fuel pressure, are advantageous in this context.

In particular, examples of the internal combustion engine in which two self-acting pressure valves are arranged in the connecting line between the first fuel reservoir and the second fuel reservoir, wherein the second pressure valve is arranged between the first pressure valve and the second fuel reservoir, the first pressure valve opens against a return force when a first predeterminable pressure p_open in the first fuel reservoir is exceeded, and the second pressure valve closes against a return force when a second predeterminable pressure p_close>p_open in the first fuel reservoir is exceeded, are advantageous here.

After the internal combustion engine is put into operation, a pressure is built up in the fuel supply system by means of a fuel pump. As soon as this pressure p1 exceeds a certain level, namely a first predeterminable pressure p_open, the first pressure valve opens and the second fuel reservoir is filled with fuel stemming from the first fuel reservoir via the connecting line. As the pressure in the fuel rises further, the second valve which is arranged in the connecting line closes when the pressure p_close is reached, thus ending, i.e. completing, the filling operation of the second fuel reservoir.

The two pressures p_close and p_open can be influenced, i.e. defined, by means of the design features of the pressure valves, wherein the elements which generate the return forces and the valve closing elements are of particular significance.

Examples of the internal combustion engine in which the following applies to the first predeterminable pressure p_open: 100 bar<p_open<220 bar are advantageous here.

In particular, embodiments of the internal combustion engine in which the following applies to the first predeterminable pressure p_open: 130 bar<p_open<200 bar are advantageous.

Embodiments of the internal combustion engine in which the following applies to the second predeterminable pressure p_close: 230 bar<p_close<400 bar are advantageous.

In particular, embodiments of the internal combustion engine in which the following applies to the second predeterminable pressure p_close: 250 bar<p_close<350 bar are advantageous.

The pressure p_close should be high enough to ensure that the cylinders for injection nozzles can be supplied with fuel for n operating cycles at the beginning of a restart. On the other hand, the selected value of said pressure p_close should not be higher than necessary since the pump is driven by the internal combustion engine and the filling of the second fuel reservoir by means of the pump reduces the power made available by the internal combustion engine.

In any case, when the internal combustion engine is switched off a pressure p_close or p2 which is too high could not be maintained until a restart but would dissipate—as it would in the fuel supply system itself.

Thus, an internal combustion engine comprises at least two cylinders each including an injection nozzle and a fuel supply system for supplying the cylinders with fuel. The fuel supply system includes a supply line connecting each injection nozzle to a first fuel reservoir storing fuel at a first pressure, the first fuel reservoir filled by a pump provided upstream, a second fuel reservoir storing fuel at a second pressure greater than the first pressure and connected to the first fuel reservoir via a connecting line for filling with fuel; and a bypass line connecting the second fuel reservoir to each injection nozzle. The bypass line opens into the fuel supply system downstream of the first fuel reservoir, thereby forming a connection point, and a shutoff element is arranged in the bypass line, opening or shutting off the bypass line.

Examples of the internal combustion engine in which the shutoff element arranged in the bypass line is a valve which can be actuated electrically by means of an engine controller are advantageous.

Examples of the internal combustion engine in which at least one further shutoff element is arranged between the first fuel reservoir and the connection point, said shutoff element isolating the first fuel reservoir from the fuel supply system situated downstream in the closed position when the shutoff element arranged in the bypass line is open, are advantageous.

Closing the further shutoff element during a restart prevents fuel from being delivered into the first fuel reservoir from the second fuel reservoir via the bypass line and the pressure p2 being dissipated via the first fuel reservoir.

Examples of the internal combustion engine in which the at least one further shutoff element is a check valve are advantageous here. In this case, the valve closes automatically owing to the fuel pressure p2 present in the secondary fuel system, the connection point and the further shutoff element, wherein no pressure exerts a counteracting effect or a lower pressure acts from the direction of the first fuel reservoir when the internal combustion engine is switched off.

In addition to the actual low-pressure fuel pump, fuel supply systems for direct-injection internal combustion engines have a second pump, namely a high-pressure pump. While the high-pressure pump ensures the required high injection pressures, the actual fuel pump serves as a "priming pump" for filling the high-pressure pump. The high-pressure pump uses additional driving power that has to be provided by the internal combustion engine, reducing the effective efficiency.

A method for restarting an internal combustion engine of a type described above, is achieved by means of a method wherein the injection nozzle of at least one cylinder is supplied with fuel from the second fuel reservoir for the first n operating cycles ($100 > n \geq 1$) of the restart, for which purpose the injection nozzle is connected to the second fuel reservoir by opening the shutoff element arranged in the bypass line.

What has already been stated in connection with the internal combustion engine according to the disclosure also applies to the method according to the disclosure, for which reason reference is made in general terms at this point to the statements made above in respect of the internal combustion engine. To some extent, the various internal combustion engines utilize different method variants.

Method variants in which the injection nozzle of at least one cylinder is supplied with fuel from the second fuel reservoir for the first operating cycle (n=1) of the restart are advantageous.

The aim is to accomplish the restart within a single operating cycle or within as few as possible crankshaft revolutions, i.e. to put the internal combustion engine back into operation as quickly as possible after a switch off operation and to supply the cylinders or injection nozzles with fuel as rapidly as possible from the first fuel reservoir. A short starting time, i.e. a rapid restart, improves responsiveness and enhances driving comfort, the starting duration having a direct influence on fuel saving by means of stop-and-go operation and on pollutant emissions in stop-and-go operation.

For restarting a direct-injection internal combustion engine which is fitted with an engine controller and in the cylinders of which pistons connected to a crankshaft oscillate, examples of the method in which, starting from a stop position of the crankshaft known to the engine controller, fuel is injected first of all into a cylinder which is in the compression phase and the fuel/air mixture in this at least one cylinder is ignited are advantageous.

This procedure considerably shortens the starting time. The fact that the stopping position of the crankshaft is known eliminates time-consuming synchronization, which would otherwise noticeably lengthen the starting time and would normally require more prolonged assistance of the starting operation by the starting device.

Method variants in which, when restarting the internal combustion engine, a starting device is activated, which imparts a rotary motion to the crankshaft to assist the starting operation are advantageous in this context.

A starter, an electric motor or a similar device which is suitable for positively imparting a rotary motion to the crankshaft can be used as a starting device, for example. In this case, the starting device is employed to positively drive the crankshaft until rotation of the crankshaft can be maintained without the starting device by means of fuel injection and ignition of the fuel/air mixture.

Method variants in which, after the first n operating cycles of the restart, the injection nozzles of the at least two cylinders are supplied with fuel from the first fuel reservoir, wherein the shutoff element arranged in the bypass line is closed, are advantageous.

Figure 3:
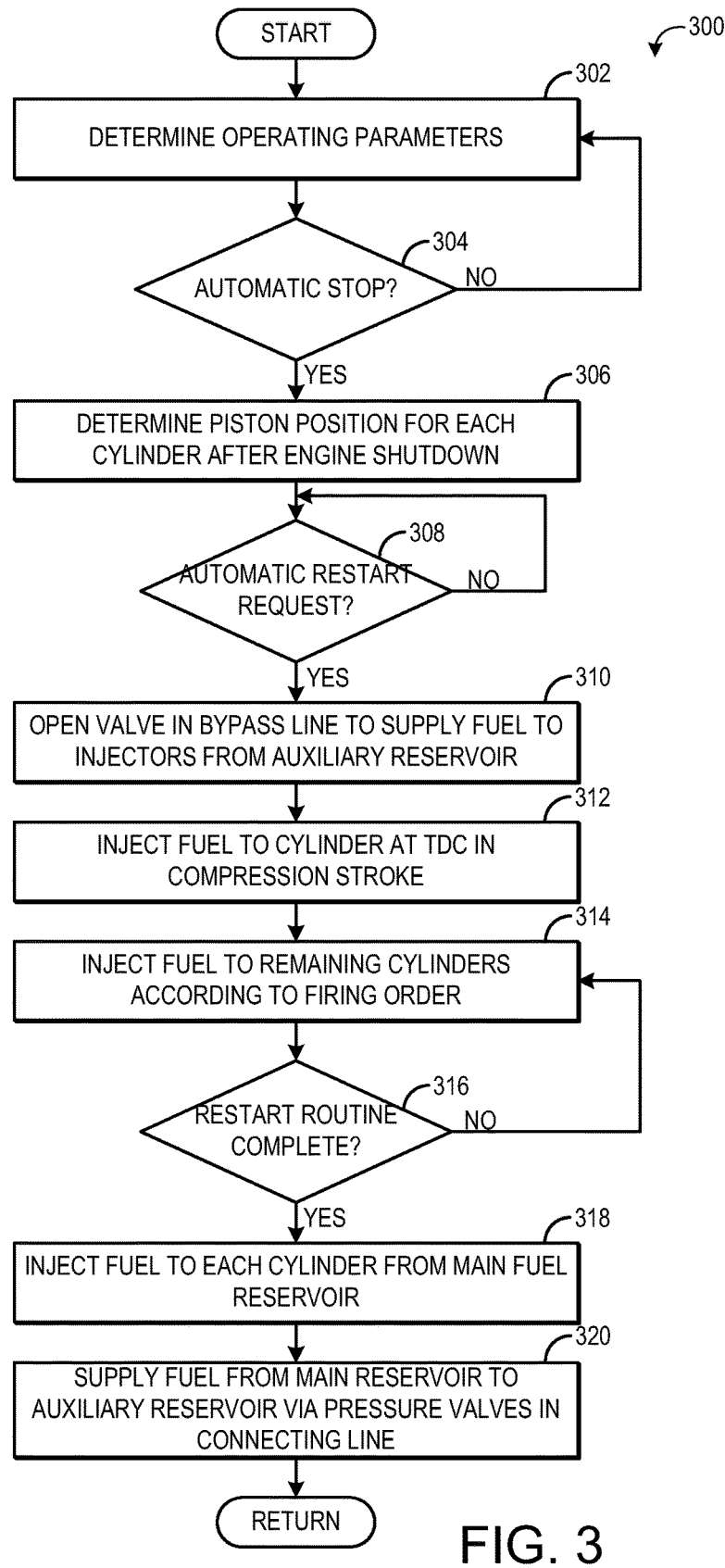
FIG. 3 is a flow chart illustrating a method for restarting an engine according to an embodiment of the present disclosure.

Turning now to FIG. 3, a method 300 for performing an automatic restart with fuel supplied from an auxiliary fuel reservoir (such as the second fuel reservoir of FIG. 2) is provided. The method of FIG. 3 may be executed via instructions in a controller of a system such as is shown in FIG. 1.

At 302, method 300 includes determining engine operating parameters. The determined operating parameters may include, but are not limited to, engine speed, engine brake request, accelerator pedal position, engine load, engine temperature, etc. At 304, method 300 judges whether or not there has been an automatic engine stop requested. An automatic stop may be requested when engine speed and/or vehicle speed is below a threshold, engine temperature is above a threshold temperature, a brake request is above a threshold (e.g., hydraulic brake fluid pressure is above a threshold pressure), and/or based on other parameters. If so, method 300 indicates yes and proceeds to 306. Otherwise, method 300 indicates no and proceeds to return.

Responsive to the automatic stop, fuel injection may be ceased and spark ignition may terminate. As such, the engine may stop combusting and spin down to a stop. At 306, the piston position of each cylinder after the engine shuts down may be determined and stored for use during a subsequent engine start. Piston position may be determined via a suitable method, such as determining crankshaft angle, camshaft angle, or other methods. At 308, method 300 determines if an automatic restart is requested. The engine restart request may be automatically initiated via a controller monitoring vehicle conditions, such as brake pedal condition (e.g., a restart may be requested when an operator lifts his or her foot off the brake pedal), accelerator pedal condition, or other parameter.

If no request is received, the method loops back and continues to wait for an automatic start request. If the request is received, method 300 proceeds to 310 to open the valve in the bypass line between the auxiliary fuel reservoir and the fuel injector to supply fuel from the auxiliary reservoir the injector. At 312, method 300 includes injecting fuel to a first cylinder of the engine, where the first cylinder is selected from all the cylinders of the engine based on the position of the piston and/or cylinder stroke. In one example, the first cylinder to receive a fuel injection event may be a cylinder that was stopped in the compression stroke, where the intake and exhaust valves are closed and the piston is traveling upward toward TDC.

At 314, method 300 comprises injecting fuel to each remaining cylinder according to a firing order of the cylinders. For example, the engine may be a four cylinder engine having a firing order of 1-3-4-2. If the engine stops during the automatic stop such that cylinder 3 is paused in the compression stroke, cylinder 3 may receive the first fuel injection event during the restart routine. Then, cylinder 4 may receive fuel followed by cylinder 2 and cylinder 1. To initiate combustion, following a fuel injection event, spark ignition may be initiated at the fueled cylinder. Additionally, a starter motor may be activated prior to or during the engine restart routine to rotate the engine and cause the pistons to oscillate.

At 316, method 300 judges if the restart routine is complete. In one embodiment, the restart routine may be complete after a predetermined number n of engine cycles, such as less than 100 engine cycles and greater than one engine cycle (e.g., where an engine cycle is defined by each cylinder firing once). In some examples, n is selected based on an engine stopping position (for example, n may be higher the further the engine position is from a desired stopping position), atmospheric pressure (e.g., n may be higher at lower atmospheric pressures), and/or an engine run-up speed profile deviation from a desired engine run-up speed profile (e.g., n may be higher the greater the integrated deviation during the engine run-up and before reaching idle speed).

In another embodiment, the restart routine may be complete when the fuel pressure in the main fuel reservoir reaches a threshold pressure (e.g., greater than the fuel pressure in the auxiliary fuel reservoir) and/or when the fuel pressure in the auxiliary fuel reservoir drops below a threshold. If the routine is not complete, method 300 loops back to 314 to continue to inject fuel to the cylinders from the auxiliary fuel reservoir. If the routine is complete, method 300 proceeds to 318 to inject fuel to the cylinders from the main fuel reservoir (such as the first fuel reservoir of FIG. 2). During the restart routine, the fuel pump that supplies the fuel from the main fuel reservoir to the injectors may be activated to start to build pressure in the main fuel reservoir. Once the restart routine is complete and the pressure in the main fuel tank is at a sufficient pressure, the fuel pump continues to operate to supply fuel to the injectors from the main fuel reservoir. As the fuel pressure in the auxiliary reservoir has most likely decreased due to its fuel being supplied to the injectors, the pressure-sensitive valves in the connecting line may be open such that fuel from the main fuel reservoir may also flow to the auxiliary fuel reservoir, as indicated at 320. Once the pressure in the auxiliary fuel reservoir reaches a threshold, one of the pressure sensitive valves closes and fuel is no longer supplied to the auxiliary reservoir. Further, once fuel is supplied to the injectors from the main fuel reservoir, the valve in the bypass line between the auxiliary fuel reservoir and the injectors may be closed.

Thus, the method described herein provides for a method for an engine, comprising: responsive to an engine restart request following an automatic stop, injecting fuel from an auxiliary fuel reservoir to at least a first cylinder of the engine; and once fuel pressure in a main fuel reservoir reaches a threshold pressure, injecting fuel from the main fuel reservoir to each cylinder of the engine.

The method may further comprise prior to initiating the engine restart, determining a position of each piston of each cylinder of the engine, and wherein injecting fuel from the auxiliary fuel tank to at least the first cylinder comprises selecting a cylinder having a piston at or below top dead center in a compression phase as the first cylinder and injecting fuel from the auxiliary fuel tank to the first cylinder. The method may further comprise, after injecting fuel to the first cylinder, injecting fuel from the auxiliary fuel reservoir to each remaining cylinder of the engine according to a predetermined cylinder firing order until the fuel pressure in the main fuel reservoir reaches the threshold pressure. The method further comprises supplying fuel to the auxiliary fuel reservoir from the main fuel tank via a connecting line fluidically coupling the main fuel tank to the auxiliary fuel reservoir, the supply of fuel to the auxiliary fuel reservoir regulated by a first and a second pressure-sensitive valve. The method further comprises supplying fuel from the auxiliary fuel reservoir to each injector of each cylinder of the engine via a bypass line regulated by an electronically controlled valve.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An internal combustion engine, comprising:
   at least two cylinders each including an injection nozzle; and
   a fuel supply system for supplying the cylinders with fuel, the fuel supply system including:
   a supply line connecting each injection nozzle to a first fuel reservoir storing fuel at a first pressure, the first fuel reservoir filled by a pump provided upstream;
   a second fuel reservoir storing fuel at a second pressure less than the first pressure and connected to the first fuel reservoir via a connecting line for filling with fuel; and
   a bypass line connecting the second fuel reservoir to each injection nozzle,
   wherein the bypass line opens into the fuel supply system downstream of the first fuel reservoir, thereby forming a connection point,
   wherein a shutoff element is arranged in the bypass line, opening or shutting off the bypass line, and wherein at least first and second self-acting pressure valves are arranged in the connecting line between the first fuel reservoir and the second fuel reservoir, said first and second pressure valves being opened to fill the second fuel reservoir with fuel, and said first and second pressure valves opening and closing in accordance with at least one applied fuel pressure.

2. The internal combustion engine as claimed in claim 1, wherein the second pressure valve is arranged between the first pressure valve and the second fuel reservoir, wherein the first pressure valve opens against a return force of a first return spring arranged in the connecting line and the second fuel reservoir is filled with fuel from the first fuel reservoir when the first pressure in the first fuel reservoir is exceeded, and wherein the second pressure valve closes against a return force of a second return spring arranged in the connecting line to stop the filling when a third pressure, greater than the first pressure, in the first fuel reservoir is exceeded.

3. The internal combustion engine as claimed in claim 2, wherein the first pressure is greater than 100 bar and less than 220 bar.

4. The internal combustion engine as claimed in claim 2, wherein the first pressure is greater than 130 bar and less than 200 bar.

5. The internal combustion engine as claimed in claim 2, wherein the second pressure is greater than 230 bar and less than 400 bar.

6. The internal combustion engine as claimed in claim 2, wherein the second pressure is greater than 250 bar and less than 350 bar.

7. The internal combustion engine as claimed in claim 1, wherein the shutoff element arranged in the bypass line is actuated electrically by an engine controller.

8. The internal combustion engine as claimed in claim 1, wherein at least one further shutoff element is arranged between the first fuel reservoir and the connection point, said at least one further shutoff element isolating the first fuel reservoir from the fuel supply system situated downstream in a closed position when the shutoff element arranged in the bypass line is open.

9. The internal combustion engine as claimed in claim 8, wherein the at least one further shutoff element is a check valve.

10. A method for restarting a direct-injection internal combustion engine following a stop of a stop-and-go operation, comprising:
responsive to an engine restart request, supplying an injection nozzle of at least one cylinder with fuel from a second fuel reservoir for a first n operating cycles ($100 > n \geq 1$) of the restart, the injection nozzle supplied with fuel from the second fuel reservoir by opening a shutoff element arranged in a bypass line; and
after the first n operating cycles, supplying the injection nozzle with fuel from a first fuel reservoir, wherein a pressure of the fuel stored in the first fuel reservoir is greater than a pressure of the fuel stored in the second fuel reservoir.

11. The method as claimed in claim 10, wherein the injection nozzle of at least one cylinder is supplied with fuel from the second fuel reservoir for a first operating cycle (n=1) of the restart, the first fuel reservoir being different from and positioned in a separate location distinct from the second fuel reservoir.

12. The method as claimed in claim 10 wherein the engine is a direct-injection internal combustion engine which is fitted with an engine controller and in cylinders of which pistons connected to a crankshaft oscillate, the method further comprising, starting from a stop position of the crankshaft known to the engine controller, injecting fuel first into a cylinder which is in a compression phase and igniting a fuel/air mixture in this at least one cylinder.

13. The method as claimed in claim 12, further comprising activating a starting device when restarting the internal combustion engine, the starting device imparting a rotary motion to the crankshaft to assist the starting operation.

14. The method as claimed in claim 10, further comprising, after the first n operating cycles of the restart and the injection nozzle of at least two cylinders is supplied with fuel from the first fuel reservoir, closing the shutoff element arranged in the bypass line, where n is selected based on an engine stopping position, atmospheric pressure, and/or an engine run-up speed profile deviation from a desired engine run-up speed profile.

15. The method of claim 10, wherein n is selected based on an engine stopping position and n is higher the further the engine stopping position is from a desired stopping position, or wherein n is selected based on an engine run-up speed profile deviation from a desired engine run-up speed profile and n is higher the greater the deviation is during engine run-up and before reaching idle speed.

16. The method of claim 10, further comprising supplying fuel to the second fuel reservoir from the first fuel reservoir via a connecting line fluidically coupling the first fuel reservoir to the second fuel reservoir, the supply of fuel to the second fuel reservoir regulated by first and second pressure-sensitive valves arranged in the connecting line.

17. A method for an engine, comprising:
responsive to an engine restart request following an automatic stop, injecting fuel from an auxiliary fuel reservoir to at least a first cylinder of the engine;
once fuel pressure in a main fuel reservoir reaches a threshold pressure, injecting fuel from the main fuel reservoir to each cylinder of the engine; and
supplying fuel to the auxiliary fuel reservoir from the main fuel reservoir via a connecting line fluidically coupling the main fuel reservoir to the auxiliary fuel reservoir, the supply of fuel to the auxiliary fuel reservoir regulated by first and second pressure-sensitive valves arranged in the connecting line.

18. The method of claim 17, further comprising prior to initiating engine restart, determining a position of each piston of each cylinder of the engine, wherein injecting fuel from the auxiliary fuel reservoir to at least the first cylinder comprises selecting a cylinder having a piston at or below top dead center in a compression phase as the first cylinder and injecting fuel from the auxiliary fuel reservoir to the first cylinder, and further comprising, after injecting fuel to the first cylinder, injecting fuel from the auxiliary fuel reservoir to each remaining cylinder of the engine according to a predetermined cylinder firing order until the fuel pressure in the main fuel reservoir reaches the threshold pressure.

19. The method of claim 17, further comprising supplying fuel from the auxiliary fuel reservoir to each injector of each cylinder of the engine via a bypass line regulated by an electronically controlled valve.

20. The method of claim 17, wherein the second valve is arranged between the first valve and the auxiliary fuel reservoir, wherein the first valve opens and the auxiliary fuel reservoir is filled with fuel from the main fuel reservoir when a first predeterminable pressure in the main fuel reservoir is exceeded, and wherein the second valve closes to stop the filling when a second predeterminable pressure in the main fuel reservoir, greater than the first predeterminable pressure, is exceeded.

\* \* \* \* \*